Patented Apr. 7, 1942

2,278,941

UNITED STATES PATENT OFFICE 2,278,941

ALMONDS, PEANUTS, AND OTHER SIMILAR NUTS

Albert Musher, New York, N. Y., assignor to Musher Corporation, New York, N. Y., a corporation of New Jersey No Drawing. Application October 25, 1941, Serial No. 416,585

10 Claims. (Cl. 99—126)

The present invention relates to nuts, particularly to nuts having a relatively softer type shell, and more particularly to peanuts, almonds, and similar types of nuts, and nut kernels.

It is among the objects of the present invention to provide a method of shelling and/or blanching and/or roasting almonds, peanuts, etc., so as to reduce the operating cost or so as to produce a nut of enhanced flavor or other improved edible characteristics.

Another object of the present invention is to provide peanuts or almonds which may be ground to form an improved peanut paste, peanut butter or almond paste.

It is still further an object of the present invention to provide a method for eliminating, modifying or reducing the bitterness of the raw nuts.

Also, it is a further object to provide a nut which may be more quickly or more uniformly roasted or toasted, or which may be roasted or toasted within reduced periods of time.

Also, it is a further purpose to provide a nut which may enable improved adhesion to its surface of various coating materials as for example, a sugar coating, chocolate coating, a salt or fat coating, etc.

A still further object of the present invention is to provide a peanut or almond or similar type nut which may have improved softness or other new desired edible characteristics or which may, if desired, have some of the oil or fat removed therefrom without substantially destroying the unity or original form of the nut.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing these objects the almonds, peanuts, or similar types of nuts, either in their shelled or unshelled, blanched or unblanched, roasted or unroasted condition are placed in a closed chamber in which they are subjected to an elevated pressure ranging, for example, from between about 20 or 25 pounds per square inch to about 300 or 350 pounds per square inch and at a temperature ranging, for example, between about 250° F. and 550° F., and for a time period ranging, for instance, from 3 to 10 seconds, to 5 or 6 minutes, or longer, depending upon the results desired, and the equipment and other conditions that are used. During this procedure the chamber may or may not be rotated, as desired.

The chamber is then suddenly and instantaneously opened into a low pressure (preferably relatively unconfined) area, such as the atmosphere, whereupon the almonds are ejected from the chamber and result in a substantially shelled condition, or in a blanched condition, or in a roasted or toasted condition, but generally without substantial disintegration, shattering or disruption of the unity or original form of the nuts, depending upon the procedures used.

Also, expansion of the nut kernels may take place with disruption of the structure of the nut, or with disruption of the oil cells of the nut, so as to enable more complete, or easier expression or extraction of the oil therefrom, or so as to enable extraction of a better quality of oil therefrom.

The pressure and temperature may be obtained by introducing saturated or superheated steam into the chamber, or if desired, the chamber may be externally heated, in which case steam may be admitted to the chamber, or, the moisture content of the nuts may be so regulated so that the moisture from within the nuts will generate the necessary pressure. For various modifications and results in carrying out this invention the steam may be moist or dry.

Also, various flavoring materials such as salt, for example, or other flavoring materials, either dry or liquid, or water, may be admitted or placed in the chamber so as to become impregnated within the nuts during this treatment, or so as otherwise to modify the resultant products.

It is desirable at times to place a coating on or within the nut so as to permit the formation of harder walls and thereby so as to result in a greater or more efficient explosion of the nut product. Starch, resins, sugars, gums, and similar materials may be used to provide such a coating as, for instance, by mixing these materials in water or aqueous materials, and then coating the nut pieces, and then allowing the material to dry on these nut pieces.

As a result of the procedures outlined, unshelled almonds or peanuts may be shelled, blanched and roasted or toasted in one operation. Also, if shelled, unblanched nuts are used, this procedure may be used to blanch the nuts. Still further, with raw, blanched or unblanched nuts, this procedure may be used to roast or toast the nuts. Still further, if roasted, blanched nuts are used, this procedure may be utilized to disrupt the structure of the nuts, or so as to enable a toasting of the nuts.

In other words, nuts either in their shelled or unshelled, blanched or unblanched, roasted or unroasted, whole or broken or pulverized condition, may be treated in accord with this invention so as to produce the desired results of shelling, blanching, roasting, toasting, structure disruption, etc.

The conditions of the explosion procedure, and particularly the pressure, may be controlled so that unshelled almonds or peanuts may merely be shelled or, by increasing the pressure, the peanuts or almonds may be shelled and blanched, or by still further increasing the pressure the peanuts or almonds may be shelled, blanched and roasted or toasted.

Superheated steam may be advantageously used where it is desired to roast or toast the nuts of this invention.

If desired, the raw nut may be exploded in accord with this invention so as to produce expansion, structure disruption or a porosity of the nut so as to enable improved roasting procedure by enabling the heat of the roast to more uniformly or more quickly enter within the body of the nut. Also, the structure distruption or increased porosity of the nuts may be utilized to enable improved cooling procedures, as for example, by the use of air, to more uniformly and more quickly cool the nut following the roasting operation.

Also, the bitterness of various raw nuts, as for example, peanuts, may be modified, reduced or eliminated by the use of this invention.

Also, where interstices and eroded surfaces, or pores, are produced in the nuts, various coatings such as chocolate coating, sugar coating, or even the salt or fat of the salting or roasting operation may be enabled to more readily and more permanently adhere or cling to the surface of the nut because, for example, of the anchoring of the coating within these pores or interstices.

Also, the peanuts or almonds, etc., produced in accord with this invention may be treated so that they will be of a softer, more tenderized, or more edible condition. Also, a better keeping quality of the nut, or of the fat or oil contained therein, may be noted.

Also, a further advantage that may be noted is the improvement in the pulverizing or powdering quality of the nut.

By using nuts treated in accord with this invention improved chocolate coated peanuts, chocolate coated almonds, Jordan almonds, peanut brittle, salted or roasted peanuts or almonds, and other varieties of improved nut products may be produced.

If desired, the peanuts or almonds, following the explosion procedure herein described, may be placed in a warm chamber so as to thin and drain the oil or fat within the nut, or the oil may be allowed to drain in its unwarmed condition following the disruption of oil cells within the nut. By eliminating some or a good part of the oil within the nut in this way, an entirely new type of nut may be produced in which the fat or oil content is substantially reduced but without the nut itself being in a substantially changed or modified shape or form as compared with its original shape or form.

Also, because of the breaking or loosening of the oil cells within the nut, extraction or expression of the oil therefrom may be more easily or more readily accomplished. Still further, where it is not necessary to use the usual high pressure or high temperatures for the expression of oil, a better quality of oil is produced.

In treating unshelled almonds or unshalled peanuts, or even in treating the almond shells or peanut shells themselves, in accord with this invention, new and unusual products result with reference to the shells. For example, the unshelled nuts or the nut shells alone may be treated in accord with this invention so as to produce a relatively disintegrated or shredded shell, or a shell of a softer, more absorbent, or increased water-wettable quality. The resultant shells which are produced may be used for various purposes, as for example, for absorbents, for fillers, or filtering mediums, or they may even be more readily ground or powdered into a new and improved type of shell meal.

The shells or the skins of the nuts may be removed from the nut kernels, following the explosion, by various procedures as, for example, by blowing, or by floating in water, etc.

The peanuts or almonds produced in accord with this invention also may be pulverized or may be ground into a new and improved type of peanut butter or almond paste. Various advantages of the resultant almond paste or peanut butter that may be noted are, for example, improved flavor, decreased seepage of oil therefrom, smoother taste quality of other advantages.

In carrying out this invention it is also possible to cook in water or other liquids, or to steam, freeze, dry roast or oil roast, multiple explode, enzyme treat, water wash or water soak the nuts in order to obtain the specific results required, as for example, in order to produce enhanced expression of the oil therefrom, in order to produce a more tender nut for edible purposes, in order to modify the cell disruption or the structure disruption of the nut, and so forth. Also, various combinations of these embodiments may be utilized at different places in the procedure.

Wherever the nuts are to be exploded following any of these embodiments in which water or moisture is used, it generally will be necessary to dry the nuts until the water content is reduced, for example, to less than 10% to 15% or to less than 20%.

Where the nuts are frozen so as to enhance the breaking of the oil cells or so as to produce any structure disruption, etc., the nuts should be given a slow freeze so as to build up large ice crystals therein so as thereby to aid in this disruption of the structure or cells thereof. Also, for this freezing procedure, the nuts should have sufficient moisture within them so as to enable the formation of the desired ice crystals. If necessary, steaming, water boiling, or other moisture absorption treatments may be used to incorporate a sufficient quantity of water within the nuts before the freezing procedure.

The advantage of using the multiple explosion treatment in the processing of the nuts of this invention is that lower temperatures and lower pressures may be utilized than would have to be used to produce relatively the same results if a single explosion were used. In the carrying out of multiple explosions, the explosion or chamber treatment above described is repeated one or more times. These repeated treatments may be carried on at the same temperatures and pressures, at higher temperatures and pressures, at lower temperatures and pressures, or at variable temperatures and pressures than the original explosion.

Where it is desired, for example, to expand the nut without getting the high roast or high toast that would result from a high single explosion treatment, the multiple explosion treatment may be used to produce such expansion of the nut with reduced roasting or toasting.

In treating the nuts of this invention in accord with the procedures described it is in many cases advisable, following the explosion treatment, to dry the nuts, or particularly to dry the surfaces of the nuts so as to guard against mold growth or other forms of deterioration that may take place because of the presence of an excess of moisture.

By the use of substantially high temperatures and pressures a highly roasted almond or peanut may be produced—the product may even have a tendency towards being burnt. These highly roasted products may then be ground or pulverized to produce a beverage drink as for instance, a coffee substitute.

The germs of various nuts and more particularly peanut germs or peanut hearts may be treated in accord with the procedures described herein. Various advantages that may be noted with reference to peanut germs so treated include, for example, expansion of the germ, a tendency towards disembittering, improved flavor, improved softness and edible quality, toasting, or various other new qualities that are of importance with reference to the utilization of these peanut hearts.

*Example I*

Unshelled almonds are placed in a closed chamber and saturated steam is allowed to enter into the chamber so as to build up as quickly as possible a pressure of 140 pounds per square inch at a temperature of about 360° F. The almonds are kept in the chamber under these conditions for a period of 1 minute and immediately thereafter the chamber is suddenly opened to the atmosphere so as to result in an instantaneous drop in pressure and ejection of the almonds.

*Example II*

Unshelled almonds are treated in accord with the procedure described in Example I except that the steam pressure is 215 pounds per square inch, the temperature is about 395° F. and the time period is 30 seconds. Two other batches of almonds are treated the same way except that one batch is treated for 45 seconds and the second batch is treated for 1¼ minutes.

There may be noted from the products resulting from these three batches that some of the almonds have been shelled and some of the almonds have been shelled and blanched. Also, some disintegration of the fibers of the almond shells may be noted.

*Example III*

Four batches of shelled, unblanched almonds are treated in accord with the procedure described in Example I except that the conditions for the individual batches are as follows:

a. 215 pounds pressure—about 395° F. temperature—20 seconds.
b. 215 pounds pressure—about 520° F. temperature superheated steam—30 seconds.
c. 215 pounds pressure—about 400° F. temperature—1¼ minutes.
d. 215 pounds pressure—about 520° F. temperature superheated steam—1 minute.

There may be noted from the resultant products that some of these procedures produce nuts in a more broken condition whereas others produce nuts in a generally whole condition. Also it may be noted that some of the nuts have been blanched, whereas others have been blanched and toasted or roasted.

*Example IV*

Shelled, unblanched Spanish No. 1 peanuts are treated in accord with the procedure described in Example I except that the time period is 3 minutes, with the saturated steam pressure being 140 pounds, at a temperature of about 360° F. A second batch of shelled, unblanched Spanish No. 1 peanuts are treated for 1 minute at 215 pounds pressure and at a temperature of about 395° F. A third batch of these peanuts is treated for 2 minutes at 215 pounds pressure and at a temperature of about 395° F. It will be noted that peanuts from some of these lots are blanched and roasted or toasted to a higher or lower degree depending upon the conditions used.

*Example V*

Shelled, unblanched medium Virginia peanuts which have been dry roasted are treated in accord with the procedure described in Example I at a pressure of 140 pounds per square inch and at a temperature of about 360° F. for a time period of 1 minute. In order to produce a roasted peanut which has a still higher degree of toasting these peanuts may be treated for a period of 2 minutes instead of 1 minute.

*Example VI*

Shelled, raw, unblanced medium Virginia peanuts are processed in accord with the procedure outlined in Example I except that the saturated steam pressure is 215 pounds per square inch, the temperature is about 395° F. and the time period is 2 minutes. A procedure of this type enables the production of blanched peanuts which have toasted or roasted characteristics.

*Example VII*

A further example of peanuts treated in accord with this invention may be produced by treating blanched, raw, medium Virginia peanuts in accord with the process described, for a period of 30 seconds at 215 pounds pressure and at a temperature around 395° F. If desired the time period may be for 1 minute instead of 30 seconds.

*Example VIII*

Peanut germs or peanut hearts are treated in accord with the procedure described in Example I except that the pressure is 215 pounds per square inch, the temperature is about 395° F. and the time period is 15 seconds. Two more batches of peanut germs may be processed in the same way except with a change in the time period to 35 seconds and 45 seconds respectively. An examination of the resultant peanut hearts from among these various batches will show a disembittering, expansion, or toasting, and so forth.

What is claimed is:

1. The process of toasting shelled, originally soft shell nuts, said process comprising subjecting the nuts to steam at an elevated temperature and pressure and thereafter suddenly releasing the nuts to a lower temperature and pressure.

2. The process of blanching shelled, originally soft shell nuts, said process comprising subjecting the nuts to steam at an elevated pressure and temperature and thereafter suddenly releasing the nuts to a lower temperature and pressure.

3. The process of shelling soft shell nuts, said process comprising subjecting the nuts to steam at an elevated temperature and pressure and thereafter suddenly releasing to a lower temperature and pressure.

4. The process of shelling, blanching and toasting, in one operation, soft shell nuts, said process comprising subjecting the nuts to steam at an elevated temperature and pressure and thereafter suddenly releasing the nuts to a lower temperature and pressure.

5. A steam exploded, structure disrupted soft shell nut, the shell, kernel and germ of said nut being in said steam exploded and structure disrupted condition.

6. A steam exploded, structure disrupted, at least partially disembittered germ of the soft shell nut.

7. A steam exploded, structure disrupted, fiber torn shell of a soft shell nut.

8. A steam exploded, structure disrupted, originally soft shell nut, said nut being in ground condition and having a coffee-like flavor.

9. The product of claim 5, the soft shell nut being an almond.

10. The product of claim 5, the soft shell nut being a peanut.

ALBERT MUSHER.